June 12, 1951  D. W. BLAIR ET AL  2,556,253
GIMBAL CLAMPING DEVICE
Filed June 10, 1949

Donald W. Blair,
Adelbert Barry,
INVENTORS.
BY Dwight C. Otis
AGENT.

Patented June 12, 1951

2,556,253

UNITED STATES PATENT OFFICE 2,556,253

GIMBAL CLAMPING DEVICE

Donald W. Blair and Adelbert Barry, Houston, Tex., assignors, by mesne assignments, to Standard Oil Development Company, Elizabeth, N. J., a corporation of Delaware Application June 10, 1949, Serial No. 98,246

4 Claims. (Cl. 73—382)

The present invention relates to gimbal mounted instruments. More particularly, the invention is directed to apparatus for damping and for clamping gimbal mounted apparatus. In a specific embodiment, the invention relates to gimbal mounted instruments for submarine geophysical prospecting and to means for damping and clamping these instruments by remote control.

When conducting geophysical prospecting surveys on dry land areas, it is well known to employ a variety of sensitive instruments including gravity meters, magnetometers, and seisometers. Each of these instruments is very delicate and, for optimum operation, each must be oriented in a particular manner with respect to the earth's surface. The problem of proper orientation has not been difficult to solve where instruments of these types were employed on dry land and were readily accessible to the operator. In recent years, however, geophysical prospecting operations have been extended to areas beneath extensive bodies of water such as lakes, oceans, bays and even to open expanses of the sea. Since the sensitivities of some of the geophysical instruments mentioned herein is very great, it is usually impractical to make measurements therewith upon the constantly moving deck of a vessel. Accordingly, in marine exploration work it has often been necessary to enclose the instruments in water proof housings, lower them onto the floor of the body of water, and there conduct the measurements by remote control. The problem of proper and exact orientation has, therefore, been greatly increased. As a result, it has become common practice to mount submarine geophysical instruments upon gimbals in a manner whereby the instruments will always assume a substantially constant orientation with respect to the earth or can be manipulated to such an orientation.

Because of the delicate nature of instruments of the types referred to above, they must be handled with great care and must not be subjected to excessive shocks and jolts. Accordingly, when mounted in gimbals, these instruments must be provided with a suitable form of clamping means so that the outer case or frame may be moved without causing the instrument frame or case, in which it is usually housed, to bump against the outer frame. These instrument mountings preferably are also provided with means for damping oscillatory swing of the instrument frame when the clamping means is released.

It is one object of the present invention to provide an improved clamping means for gimbal mounted devices.

Another object of the present invention is to provide a clamping means for gimbal mounted devices which will automatically damp the swing of the mounted device when the clamping means is released.

It is a still further object of the present invention to provide an improved clamping and damping device for gimbal mounted instruments of such nature that the device may be readily controlled from a remote distance.

The nature and objects of the present invention may best be understood by reference to the accompanying drawing in which.

Figure 1:
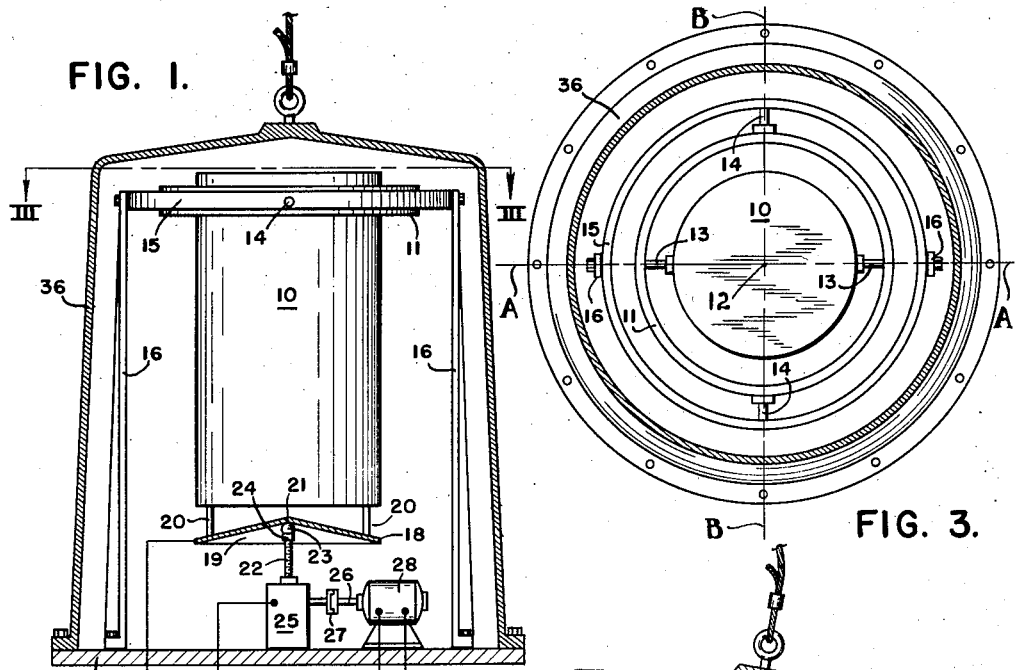
Fig. 1 is an elevation, partly in section, of a gimbal mounted instrument employing a preferred embodiment of a clamping and damping device, together with a schematic diagram of an electrical circuit for controlling the device from a remote distance in accordance with our invention.
Figure 3:
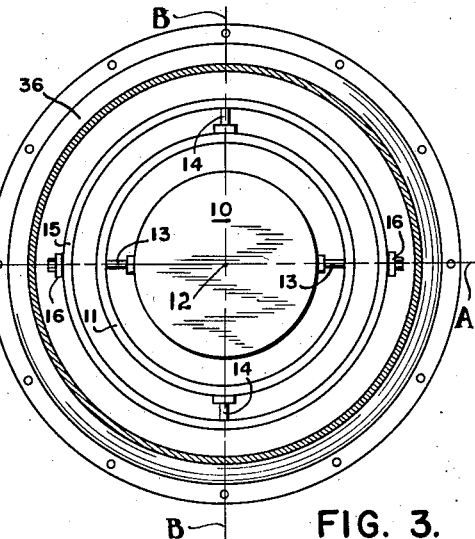
Fig. 3 is a plan view, partly in section, taken along the line III—III of Fig. 1.

Referring first to Figs. 1 and 3 of the drawing, the numeral 10 designates an inner frame member or case within which may be housed any desired mechanism or instrument, such as a gravity meter, or magnetometer, or the like. Frame or case 10 is journaled concentrically within a central gimbal ring 11, having a radial center 12, by means of pairs of trunnion pivots and bearings 13. As is shown in the drawing, trunnions 13 are arranged within ring 11 and on diametrically opposite sides thereof along the diameter A—A. Gimbal ring 11, in turn is journaled concentrically within an outer supporting frame 15 by means of trunnion pivots and bearing 14. Trunnions 14 are arranged on diametrically opposite sides of ring 11 along the diameter B—B which bisects diameter A—A perpendicularly at center 12. It is to be understood that the outer supporting frame 15 includes not only means for carrying trunnions 14 but also may include a plurality of erect legs 16 and a base member 17.

As will be apparent to workers in the art, the frame 10, together with any mechanism contained therein, constitutes a mass suspended from a gimbal. The center of gravity of this mass is preferably arranged well below the radial center 12 of ring 11 so that gravitational pull will automatically tend to align the former in a vertical line below the latter. For reasons which will become apparent, trunnion bearings 13 and 14 are preferably self-aligning ball bearings of well-known construction and completely encircle the corresponding trunnion pivots so that the latter are held firmly against movement out of ring 11 or frame 15.

Figure 4:
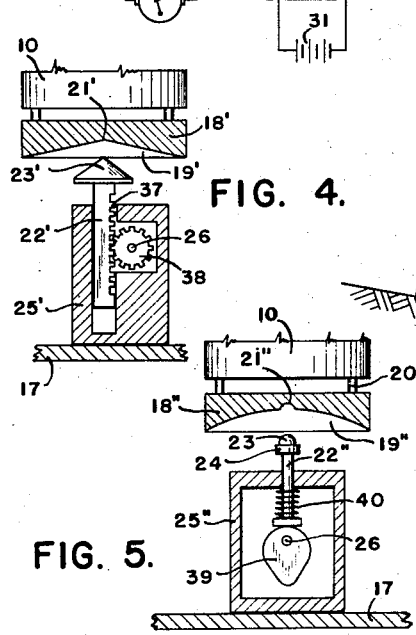
Figs. 4 and 5 are sectional elevation views of other embodiments of the clamping mechanism in accordance with our invention.
Figure 5:
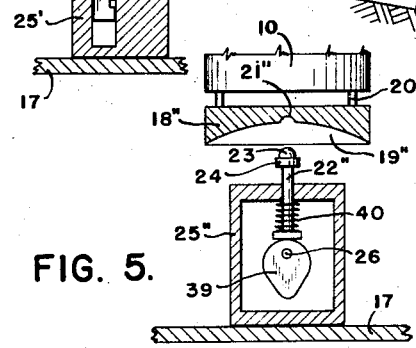

In accordance with the present invention there is affixed to frame member 10, and preferably to the bottom thereof, a concaved member 18 having a concaved surface 19 directed outwardly from frame 10. Member 18 may be a dish-like element affixed to frame 10 by a plurality of support elements 20 as shown in Fig. 1, or member 18 may be an equivalent solid block having a suitably concaved recess such as is shown in Figs. 4 and 5. Concaved surface 19 is preferably conical in form and has a central vertex or a conical apex 21. However, as will be explained more fully hereinafter, surface 19 may be concaved to conform to a wide variety of other shapes.

For illustrative purposes in the drawing of Fig. 1, it has been assumed that the center of gravity of the gimbal suspended mass, including frame 10, is at the geometric center of frame 10. It has been assumed also that the device shown therein has been arranged in a preselected normal position such that base 17 is in a horizontal plane. With these assumptions in mind, it will be seen that the center of gravity of the mass is directly below the center 12 of gimbal ring 11 on the vertical axis passing therethrough. The vertex 21 of concaved member 18 is preferably coincident with this axis, although it may be otherwise arranged for other preselected normal positions of the device as will be apparent to skilled workers in the art.

Figure 2:
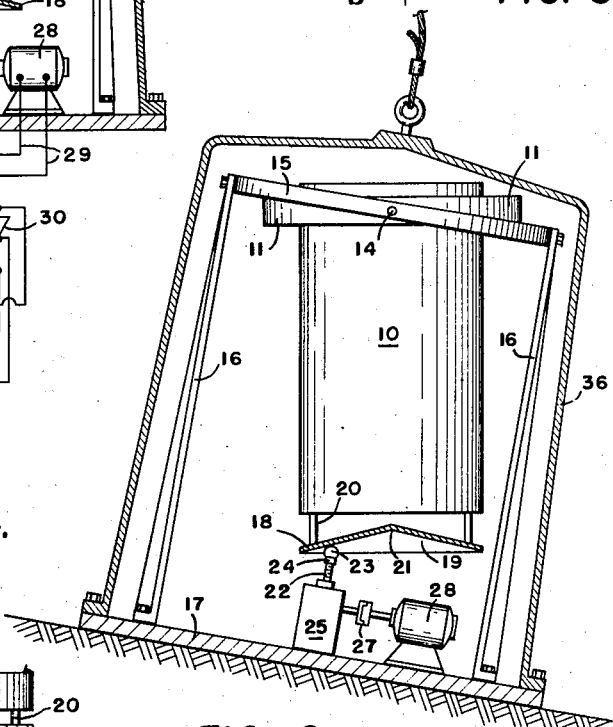
Fig. 2 is an elevation, partly in section, of the embodiment of Fig. 1 illustrating the manner in which the device of our invention effects damping of oscillation as the clamping means is slowly released.

Aligned longitudinally on a straight line or axis passing through vertex 21 and center 12 is a movable convex member 22 adapted to be moved into and out of contact with surface 19 and to come to rest at vertex 21 which is the highest, i. e. the most recessed, point on surface 19. In a preferred embodiment, as illustrated in Figs. 1 and 2, convex member 22 is a screw threaded shaft having a sphere 23 mounted upon the end thereof by retainer ring 24. Sphere 23 is free to rotate in any direction within retainer ring 24 and thereby provides an anti-friction contact with surface 19. Shaft 22 is mounted for longitudinal movement into and out of a gear box 25. Within gear box 25 are suitable gears for turning, at low speed, a nut (not shown) screw threadedly engaged upon shaft 22. Gear box 25 is secured to a suitable part of frame member 15, such as base 17. A shaft 26 having a spring loaded clutch 27 therein may connect gear box 25 to a suitable reversible motor 28. By operating motor 28 in the proper direction member 22 advances toward and/or along surface 19 until member 23 reaches vertex 21 whereupon further advance is halted, causing clutch 27 to slip. When motor 28 is operated in the reverse direction, members 22 and 23 are drawn away from vertex 21 and surface 19.

Turning now to Figure 2, let it be assumed that the device of Fig. 1 is set in other than the preselected normal position as, for example, in a position such that base 17 is in a plane slightly inclined from horizontal. It will be seen that, as member 22 is slowly retracted into gear box 25, anti-friction member 23 is drawn downward and slides along surface 19 permitting the center of gravity of mass 10 to move slowly into a position vertically beneath the center 12 of ring 11. Since mass 10 is not suddenly released, it is not free to swing as a pendulum but its movement is damped, thereby causing the mass to come to rest quickly. By employing self-aligning ball bearings in trunnions 13 and 14, friction in these bearings is reduced to a tolerable minimum and mass 10 is free to assume an accurate equilibrium position. When it is desired to clamp the gimbal supported mass 10 while the latter is in a position such as is illustrated in Fig. 2, the motor 28 is operated in a proper direction to advance anti-friction member 23 against surface 19. Member 23 then slides along surface 19 from the particular point of contact toward and into the vertex 21. Thereupon frame 10 is clamped against movement with respect to frame 15.

Motor 28 may be any suitable type of reversible motor. Preferably it may be a reversible electric motor which is connected by means of conductors 29 to a reversing switch 30 and a source of power, such as a battery 31. It will be apparent that conductors 29 may be of any desired length and, accordingly, that the driving means, including gear box 25, shaft 26, clutch 27 and motor 28, is controllable from a remote distance.

Concaved member 18 may be constructed from any suitable material such as wood, solid resin, or metal. In accordance with a preferred form of our invention, member 18 is constructed from an electrically conducting material and is secured to frame 10 by means of electrically insulating members 20. Gear box 25, shaft 22, and anti-friction contact member 23 are, likewise, constructed from electrically conducting material. A conductor 32 is electrically connected to member 18 and another conductor 33 is electrically connected to gear box 25. Conductors 32 and 33 are, in turn, also connected to a battery or other source of electrical power 34 and a current indicator 35 arranged in series. Members 18 and 23 thereby comprise switch contacts in the electrical circuit. It will be seen that, when member 23 is in contact with member 18, electric current may flow through indicator 35 thereby warning an operator at a remote distance that frame 10 is not free to move in the gimbal. However, when member 23 is not in contact with member 18, no current flows through indicator 35 and the operator can readily determine that frame 10 is free to move in the gimbal.

Although, in the foregoing description, concaved member 18, shaft 22 and gear box 25 have been described as mounted below frame 10, it will be apparent that these members may also be mounted above frame 10. Also, if desired, a cover 36 may be provided for totally encasing frame 10, gimbal 11, trunnion support member 15, legs 16, concaved member 18, and the driving means including gear box 25 and motor 28.

As mentioned earlier herein, concaved member 18 may be other than a dish-like member and may also have a concaved surface which is other than conical. It will be apparent, also, that means other than the screw-threaded shaft 22 may be employed to move the member 23 into contact with member 18 and surface 19.

Turning now to Fig. 4, another embodiment of a clamping device employing a rack and pinion in place of screw-threaded shaft 22 and a solid concaved member in place of the dish-like concaved member 18 is shown in accordance with our invention. In the drawing of Fig. 4, the numeral 18' designates a solid concaved member having a conically recessed surface 19'. Member 18' may be secured directly to inner frame 10 or may be electrically insulated therefrom on insulating pillars 20. As in the embodiment of Fig. 1, concaved member 18' is provided with a central vertex 21. A conical convex member 23', having an outer surface adapted to mate with the surface 19', is arranged upon a shaft 22' and is adapted to be moved into and out of contact with surface 19'. Shaft 22' is slidably mounted in a gear case 25'. In the embodiment of Fig. 4, shaft 22' may be provided with a rack 37 adapted to be moved by pinion 38 secured to a shaft 26 journaled upon suitable bearings in gear case 25'. As in the embodiment of Fig. 1, shaft 26 may be driven by clutch 27 and motor 28. Preferably, however, speed reduction gears are interposed on shaft 26 between motor 28 and pinion 38. If desired, a manually operated lever or crank may be used in place of motor 28 to drive shaft 26.

Still another embodiment of a clamping device in accordance with our invention is shown in elevation, and partly in section, in Fig. 5. In this embodiment, a solid concaved member 18" is secured to inner frame member 10, either directly or by means of pillars 20. Member 18" is provided with an arcuately concaved surface 19". Preferably the central vertex of surface 19" may be specially recessed as shown at 21" to receive anti-fraction convex member 23 when the latter is in clamping position. Anti-friction convex member 23 may be a sphere retained upon the end of shaft 22" by retainer ring 24 as in the embodiment of Fig. 1. Shaft 22" is slidably mounted for longitudinal movement in case 25" housing an eccentric cam 39 on shaft 26. A helical spring 40 surrounding shaft 22" within case 25" urges the shaft and contact member 23 out of contact with surface 19" and maintains contact between shaft 22" and cam 39. As in the embodiment of Fig. 4, driven shaft 26 is suitably journaled in bearings in case 25" and is preferably driven at low speed through a gear reduction train interposed along the shaft between cam 39 and motor 28.

It will be apparent to workers in the art that the best shape and dimensions of concaved surface 19 will depend upon the distance thereof from the center 12 of gimbal ring 11 and the angle through which frame 10 is permitted to swing from its predetermined normal position. In any case, member 18 should be of such dimensions that convex member 23 may always be brought into sliding contact with surface 19. Surface 19 also should be so shaped and arranged with respect to member 23 that the vertex 21, i. e. the most recessed portion of surface 19, is aligned along a desired axis preferably passing through center 12 and the center of gravity of frame 10 and any mass contained therein.

While our invention has been illustrated by a single shaft 22 adapted to move a convex member 23 into sliding and seating contact with a concaved surface 19, it will be apparent that shaft 22 may be replaced by a plurality of shafts acting simultaneously to move convex member 23 into contact with surface 19.

Having fully described and illustrated our invention, what we claim and wish to secure by Letters Patent is:

1. A device for clamping gimbal leveled apparatus comprising, in combination, an outer frame member having a gimbal ring journaled for rotation therein, an inner frame member journaled for rotation in said ring with the center of gravity thereof below the center of said ring, a member having a concaved surface and a central vertex therein secured to said inner frame with said concaved surface directed outwardly therefrom, a movable convex member interposed in a space provided between said surface and said outer frame and arranged for movement along an axis defined by a straight line passing through the center of said ring and said vertex when the latter is in a preselected normal position, and driving means secured to said outer frame and arranged for moving the convex member into and out of clamping contact with said concaved surface.

2. A device for clamping gimbal leveled apparatus comprising, in combination, an outer frame member having a gimbal ring journaled for rotation therein, a mass comprising an inner frame member journaled for rotation in said ring with the center of gravity of said mass arranged a substantial distance below the center of said ring, a member having a concaved surface and a central vertex therein secured to said inner frame with the concaved surface directed outwardly therefrom, a longitudinally movable shaft arranged in a space provided between said surface and said outer frame, the longitudinal axis of said shaft being aligned for movement along an axis defined by a straight line passing through the center of said ring and said vertex when the latter is in a preselected normal position, and driving means mounted upon said outer frame arranged for moving said shaft into and out of contact with said concaved surface and said vertex.

3. A device in accordance with claim 2 wherein the axis defined by said straight line passes substantially through the center of gravity of said mass, said concaved member is secured to the under side of said inner frame member, and the upper end of said shaft is provided with anti-friction means for contact with said concaved surface whereby oscillation of said mass is damped during slow movement of the shaft out of said vertex.

4. A device in accordance with claim 2 wherein said driving means includes a motor and clutch and is controllable from a remote distance.

DONALD W. BLAIR.
ADELBERT BARRY.

REFERENCES CITED

The following references are of record in the file of this patent:

UNITED STATES PATENTS

| Number | Name | Date |
|---|---|---|
| 1,104,892 | Heusser | July 28, 1914 |
| 1,858,384 | Andre | May 17, 1932 |
| 2,192,905 | Gattoni | Mar. 12, 1940 |
| 2,357,822 | Hasbrook | Sept. 12, 1944 |
| 2,358,980 | Kent | Sept. 26, 1944 |
| 2,383,966 | Hasbrook | Sept. 4, 1945 |

FOREIGN PATENTS

| Number | Country | Date |
|---|---|---|
| 692,754 | Germany | June 26, 1940 |